United States Patent [19]

Mohiuddin

[11] 4,152,862
[45] May 8, 1979

[54] COCKROACH EXTERMINATION APPARATUS

[76] Inventor: Mohammed S. Mohiuddin, 920 W. Lakeside, Apt. 1511, Chicago, Ill. 60640

[21] Appl. No.: 874,472

[22] Filed: Feb. 2, 1978

[51] Int. Cl.² .............................................. A01M 1/10
[52] U.S. Cl. ..................................................... 43/121
[58] Field of Search ..................... 43/121, 132 R, 107, 43/123, 131

[56] References Cited

U.S. PATENT DOCUMENTS

| 649,484 | 5/1900 | Schlachter | 43/121 |
| 1,081,363 | 12/1913 | Celene | 43/123 |
| 1,223,016 | 4/1917 | Young | 43/123 |
| 1,259,911 | 3/1918 | Seibert | 43/131 |
| 1,261,842 | 4/1918 | Muller | 43/123 |
| 2,435,317 | 2/1948 | McGrew | 43/121 |
| 3,286,872 | 11/1966 | Burdick | 43/131 X |
| 3,341,967 | 9/1967 | Kelley | 43/121 |

Primary Examiner—Nicholas P. Godici
Attorney, Agent, or Firm—Hill, Gross, Simpson, Van Santen, Steadman, Chiara & Simpson

[57] ABSTRACT

A cockroach extermination apparatus is disclosed having an outer enclosure with an open top end and a plurality of entranceways at a bottom end thereof. An inner cylindrical enclosure is receivable in telescoping fashion within the outer enclosure. The inner enclosure has a top wall and creates a darkened environment. The inner enclosure is adjustable so as to selectively close the entranceways. Within the inner enclosure a beehive-like core is removably secured in screw-like fashion. The core has a plurality of inner entranceways and a plurality of pockets into which cockroaches crawl in the darkened environment. When desired, the cockroaches are exterminated by closing the outer entranceways and then, when desired, removing the inner enclosure, unscrewing the core, and holding the core under a stream of water to wash away the cockroaches.

13 Claims, 6 Drawing Figures

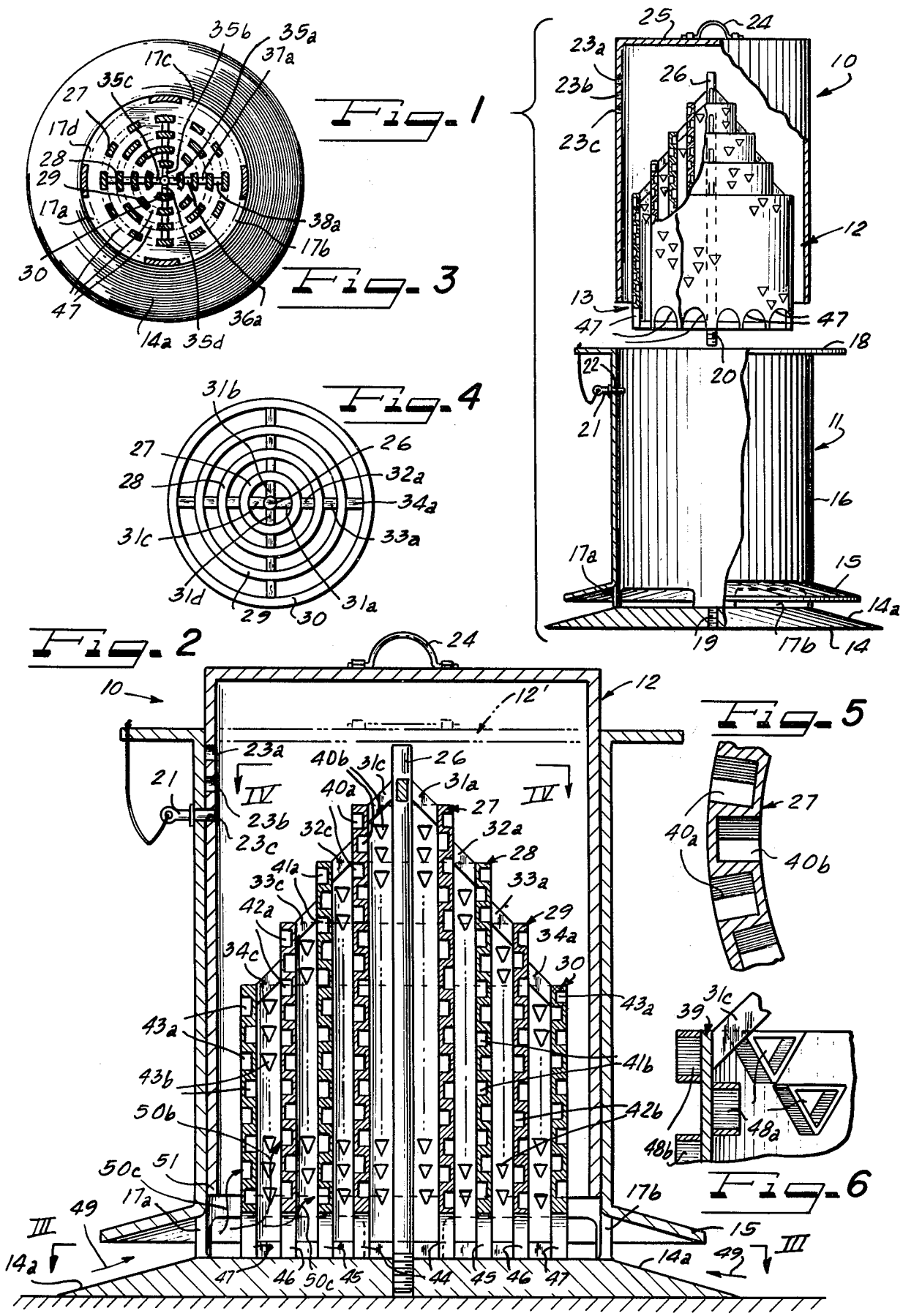

COCKROACH EXTERMINATION APPARATUS

BACKGROUND OF THE INVENTION

1. Field of the Invention

This invention relates to insect extermination systems and more particularly to a cockroach extermination apparatus.

2. Description of the Prior Art

It is known to exterminate insects including cockroaches by the use of poisonous chemical sprays and poisonous food which attracts the insects. The use of such poisons is undesirable, particularly in the case of sprays, since an area which has been sprayed must be vacated for a reasonable number of hours to permit toxic fumes to disperse. Also, in the case of poisonous insect foods, there is always the danger that small children might accidentally swallow bits or pieces of the insect food.

An alternate system for exterminating cockroaches is necessary since in every major city, cockroach infestation has become a very serious problem, especially in apartment buildings.

SUMMARY OF THE INVENTION

It is an object of this invention to provide a system for exterminating insects, particularly cockroaches, which does not make use of poisonous sprays or other poisonous substances.

It is a further object of this invention to provide an apparatus of relatively low cost for the extermination of cockroaches.

It is another object of this invention to provide an apparatus for exterminating insects, particularly cockroaches, wherein the apparatus is available to a large segment of the population, particularly segments of the population having lower purchasing power.

According to the invention, it is recognized that cockroaches will continually seek to hide themselves in dark areas, particularly dark areas which are accessible through small cracks. Cockroaches and other similar insects also prefer to lodge themselves in small darkened pocket-like areas.

With the apparatus of the invention, an enclosure means is provided which creates a dark interior space. Entrance means in the enclosure means permit insects to crawl into the dark interior space. A core means removably positioned within the enclosure means has a plurality of pockets in beehive-like fashion. The cockroaches or similar insects seek out these pockets once they are inside of the darkened space. Means are provided to close off the entrance to the enclosure means when it is believed that the core means is filled. Thereafter, at ones convenience, the entire apparatus is transported to a sink or the like where the core means is removed and washed out under a stream of water. Thereafter, the apparatus is ready for reuse.

BRIEF DESCRIPTION OF THE DRAWINGS

FIG. 1 is a side view in partial cross-section of the insect extermination apparatus of this invention;

FIG. 2 is a cross-sectional view of the apparatus of FIG. 1;

FIG. 3 is a plan view of a cross-section taken along line III—III of FIG. 2;

FIG. 4 is a view taken along line IV—IV of FIG. 2;

FIG. 5 is a fragmentary cross-sectional view of a portion of the core member and which illustrates pockets in the core member; and FIG. 6 is a fragmentary perspective view of an alternate embodiment of the core member pockets shown in FIG. 5.

DESCRIPTION OF THE PREFERRED EMBODIMENTS

The cockroach extermination apparatus or cage of this invention is generally shown at 10 in FIGS. 1 and 2. An outer cylindrical shaped member 11 is provided which receives in telescopic fashion an inner removable cylindrical member 12. A beehive-like core member 13 is removably secured in screw-like fashion to a base portion of the outer cylindrical member 11 as described below.

The outer cylindrical member 11 has a circular base 14 which has an inclined top surface 14a functioning as an entrance ramp. A downward sloping circular eave 15 surrounds a bottom portion of a cylindrical sidewall 16 of the cylindrical member 11. This eave provides shading for outer entranceways 17a, b, c, d shown most clearly in FIG. 3. These entranceways are positioned between the surface 14a and the eave 15. An upper ledge 18 is provided at a top of the outer cylindrical member 11. This ledge is useful for transporting the apparatus. The base 14 of the outer cylindrical member 11 has a central threaded aperture 19 which receives a screw 20 of the removable core member 13. A pin 21 and pin retaining aperture 22 are positioned at an upper end of the cylindrical member 11 in the cylindrical sidewall 16. This pin is used to regulate a vertical position of the inner cylindrical member 12 by engaging in positioning apertures 23a, b, c. When the pin 21 engages the aperture 23c as shown in FIG. 2, the inner cylindrical member 12 is in a raised position above the entranceways 17a, b, c, d. However, as shown at 12' in FIG. 2, when the pin 21 engages the aperture 23a, a bottom edge 51 is below the entranceways 17a, b, c, d and consequently blocks them. Aperture 23b is an intermediate position for partial opening of the entranceways.

The inner cylindrical member 12 has a top sealing surface 25 with a finger grip 24 for removing the inner cylindrical member. When the inner cylindrical member is received in telescoping fashion within the outer cylindrical member 11, a darkened enclosure is created since the sidewalls of the two cylindrical members are very closely fitting and exclude light where they telescope. The core member 13 is provided in a beehive-like configuration. A central support pole 26 is provided which is preferably threaded at the end to provide the screw portion 20. Cylindrical shaped core units 27, 28, 29 and 30 are provided. From the innermost to the outermost core units, the diameters of the units increase and the height decreases. The core units are concentric with respect to one another and, in combination, form the beehive-like core member. Upper struts 31a, b, c, d; 32a, b, c, d; 33a, b, c, d; and 34a, b, c, d maintain the cylindrical shaped core members in a spaced configuration. These upper struts respectively extend between the pole 26 and core unit 27 and between the other adjacent core members in a slanting fashion. The entire upper part of the core serves as a finger grip for removal thereof by twisting. In similar fashion, the lower struts 35a, b, c, d; 36a, b, c, d; 37a, b, c, d; and 38a, b, c, d are provided at lower ends of the cylindrical core units as shown in FIG. 3.

Each of the cylindrical shaped core units 27, 28, 29 and 30 have a plurality of arch shaped inner entrance apertures 44, 45, 46 and 47, respectively. The arch shaped inner entranceways 47 are most clearly shown in FIG. 1 and the remaining archways are shown most clearly in FIG. 2.

The core units 27, 28, 29 and 30 each have respective triangular shaped outer and inner pockets 40a, b; 41a, b; 42a, b; and 43a, b. These outer and inner pockets are triangular shaped and are of a depth sufficient to permit the comfortable occupation by cockroaches or similar insects. An enlargement of these pockets is shown at 40a and 40b in FIG. 5 wherein it is illustrated that the pockets extend both from the inside and outside surfaces of the cylindrical core members and are of a depth slightly less than the thickness of the core unit.

An alternate embodiment for the pockets shown in FIG. 5 is illustrated in FIG. 6 wherein inner pockets 48a and outer pockets 48b are provided on a thin sidewall of a core unit 39. Since the sidewall is thinner than is the case in FIG. 5, the pockets are formed by protrusions from the cylindrical surface walls. Operation of the cockroach extermination apparatus or cage of this invention will now be described. The apparatus may be positioned at any convenient location but preferably will be located in areas which cockroaches are known to inhabit. The overall dimensions of the cockroach apparatus are such that the unit can be conveniently located in a corner of a room, for example, without undue difficulty. A preferred dimension is an overall diameter of approximately five to eight inches and a height of approximately six to ten inches. However, other diameters and heights are useful depending upon the size of the insects and the particular locale and the number of insects which it is desired to trap in the inner core member.

Since cockroaches seek out darkness and particularly small pockets of darkness, they will enter the apparatus as shown by the arrow at 49, for example along the ramp 14a. They will crawl through one of the pockets 17a, b, c, d and will proceed along paths shown at 50a, b, or c, for example. At path 50c, the cockroach would enter through entranceway 17a and climb the wall of cylinder 30. For path 50a, the cockroach would pass through the inner entrance 47 and lodge in an outer pocket 42a of the cylinder 29. For path 50b, the cockroach would pass through both inner entranceways 46 and 47 so as to lodge in the outer pocket 41a of the cylinder unit 28.

When the core member 13 is full, the pin 21 is removed and the inner cylindrical member 12 drops down so as to shut off the outer entranceways 17a, b, c, d. The apparatus is then transported to a sink where the inner cylindrical member 12 is removed by use of the handle 24. The inner core member 13 is then unscrewed and placed under a running stream of water so as to remove the insects from the inner and outer pockets. Thereafter, the apparatus is reassembled and placed back in position.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. An insect extermination apparatus, comprising:
   (a) enclosure means comprising an outer enclosure having an open end through which is received an inner enclosure providing a dark interior space and entrance means in the outer enclosure for receiving insects to be exterminated;
   (b) a core means removably attached to the outer enclosure and positioned within the outer enclosure for retaining insects which crawl into the enclosure means; and
   (c) closure means for selectively closing the entrance means comprising selective movement of the inner enclosure to block the entrance means.

2. A cockroach extermination apparatus, comprising:
   (a) an outer enclosure means having an open top end and a bottom end having a plurality of entrance apertures therein, said outer enclosure means including shading means darkening the entrance apertures;
   (b) an inner enclosure means receivable through said open top end of the outer enclosure means, said inner enclosure means having a closed top end and an open bottom end;
   (c) means for setting a position of said inner enclosure means for selectively blocking the entrance apertures of the outer enclosure means; and
   (d) a beehive-like core means removably positioned within the outer enclosure means, said core means having a plurality of pocket means for receiving and housing cockroaches in a darkened environment.

3. The apparatus of claim 2 in which said core means comprises a plurality of concentric cylinders, each cylinder having inner entrance apertures and a plurality of pockets in sidewalls of the cylinders.

4. The apparatus of claim 3 in which the concentric cylinders are progressively shorter from a center cylinder to an outer cylinder.

5. The apparatus of claim 3 in which said pockets are provided on inner and outer surfaces of the cylinder sidewalls.

6. The apparatus of claim 3 in which the pockets are formed entirely within sidewalls of the cylinders.

7. The apparatus of claim 3 in which the pockets are formed in part by protrusions on the cylinder sidewalls.

8. The apparatus of claim 2 in which the outer enclosure means has a base and the core means removably attaches in screw-like fashion to the base.

9. The apparatus of claim 2 in which the shading means comprises an overhanging eave surrounding the outer enclosure means above and adjacent to the entrance apertures.

10. The apparatus of claim 2 in which ramp means are attached to the outer enclosure means adjacent the entrance apertures.

11. The apparatus of claim 2 in which the pocket means have a triangular shape.

12. The apparatus of claim 2 in which the outer enclosure means receives the inner enclosure means in a telescoping close-fitting light excluding fashion.

13. The apparatus of claim 3 in which the core means has structure means for permitting washing of insects from the pocket means under a stream of water.

* * * * *